United States Patent [19]

Hirchert

[11] Patent Number: 5,067,349
[45] Date of Patent: Nov. 26, 1991

[54] METHOD AND APPARATUS FOR BALANCING ROTATING COMPONENTS

[75] Inventor: Richard A. Hirchert, Pacific Palisades, Calif.

[73] Assignee: Allied-Signal Inc., Morristown, N.J.

[21] Appl. No.: 500,434

[22] Filed: Mar. 27, 1990

[51] Int. Cl.[5] .............................................. G01M 1/02
[52] U.S. Cl. ........................................ 73/472; 73/471
[58] Field of Search ................. 73/455, 460, 462, 471, 73/472, 474

[56] References Cited

U.S. PATENT DOCUMENTS

| | | | |
|---|---|---|---|
| 2,353,150 | 7/1944 | Dietz | 73/472 |
| 3,152,483 | 10/1964 | Hemmeter. | |
| 3,782,201 | 1/1974 | Fitts. | |
| 4,286,467 | 9/1981 | Kober. | |
| 4,543,825 | 10/1985 | Schonfeld et al. | 73/472 |
| 4,688,427 | 8/1987 | Hyland | 73/460 |

Primary Examiner—John E. Chapman
Attorney, Agent, or Firm—Ken C. Decker; William N. Antonis

[57] ABSTRACT

A method and apparatus for dynamically balancing a rotating component, such as a compressor wheel, without using an arbor is disclosed. A balancing fixture includes a nest for receiving the compressor wheel and is defined by a balancing surface on the balancing fixture. The balancing fixture is attached to a fixed support by flexures which permit tilting motion of the balancing fixture. Compressed air is communicated into an air manifold within the fixture and is communicated to the balancing surface through pressure jets to thereby support and position the compressor wheel on a cushion of compressed air. Motion of the balancing fixture is transmitted through a bracket to a pair of spaced-apart motion transducers. The motion transducers generate electrical signals which vary in response to a magnitude and direction of the tilting movement of the balancing fixture induced by unbalance of the rotating compressor wheel, and such signals are analyzed by a conventional vibratory analysis device in order to determine the amount and location of the unbalance of the compressor wheel being balanced.

4 Claims, 2 Drawing Sheets

METHOD AND APPARATUS FOR BALANCING ROTATING COMPONENTS

This invention relates to a method and apparatus for dynamically balancing small rotating components, such as turbocharger components, flywheels, fans, etc.

Dynamic balancing of small rotating components is necessary to assure proper operation and operating life of the machines in which such components are used. For example, automotive turbochargers include rotating components which often operate in speeds of excess of 100,000 rpm. Accordingly, the dynamic components of turbochargers must be balanced.

It has become customary to balance individual rotating components before assembly, and then balance the rotating assembly after installation into the turbocharger center housing. For example, compressor wheels and turbine wheels used in turbochargers are currently balanced by the prior art procedure disclosed in U.S. Pat. No. 4,543,825. This procedure requires that the component to be balanced be mounted on a stationary arbor. Accordingly, this procedure requires that the component to be balanced have a bore that extends through the component. More recently, so-called "boreless" compressor wheels have been used in automotive turbochargers. Boreless compressor wheels are not structurally weakened by a bore extending through the compressor wheel. Although commonly described as "boreless" compressor wheels, these compressor wheels do have a relatively short blind bore which extends into the hub but terminates in a plane short of the plane of maximum radial extent of the compressor wheel where the centrifugal forces applied to the wheel are the greatest during operation. Since such compressor wheels do not have a bore that extends through the compressor wheel, they cannot be balanced by the prior art procedure. Another way of balancing compressor wheels is to install the compressor wheel on an arbor and then balance both the compressor and the arbor as an assembly, but an arbor introduces balancing errors that cannot be compensated for by existing techniques.

The present invention permits balance of the "boreless" compressor wheels to desired tolerances without use of an arbor, and further enables balancing to be effected easily during manufacture, since the balance procedure according to the Present invention permits installation of the compressor wheel on the balancing fixture and removal thereof simply by placing the wheel on a balancing surface.

These and other advantages of the present invention will become apparent from the following description, with reference to the accompanying drawings, in which.

Figure 1:
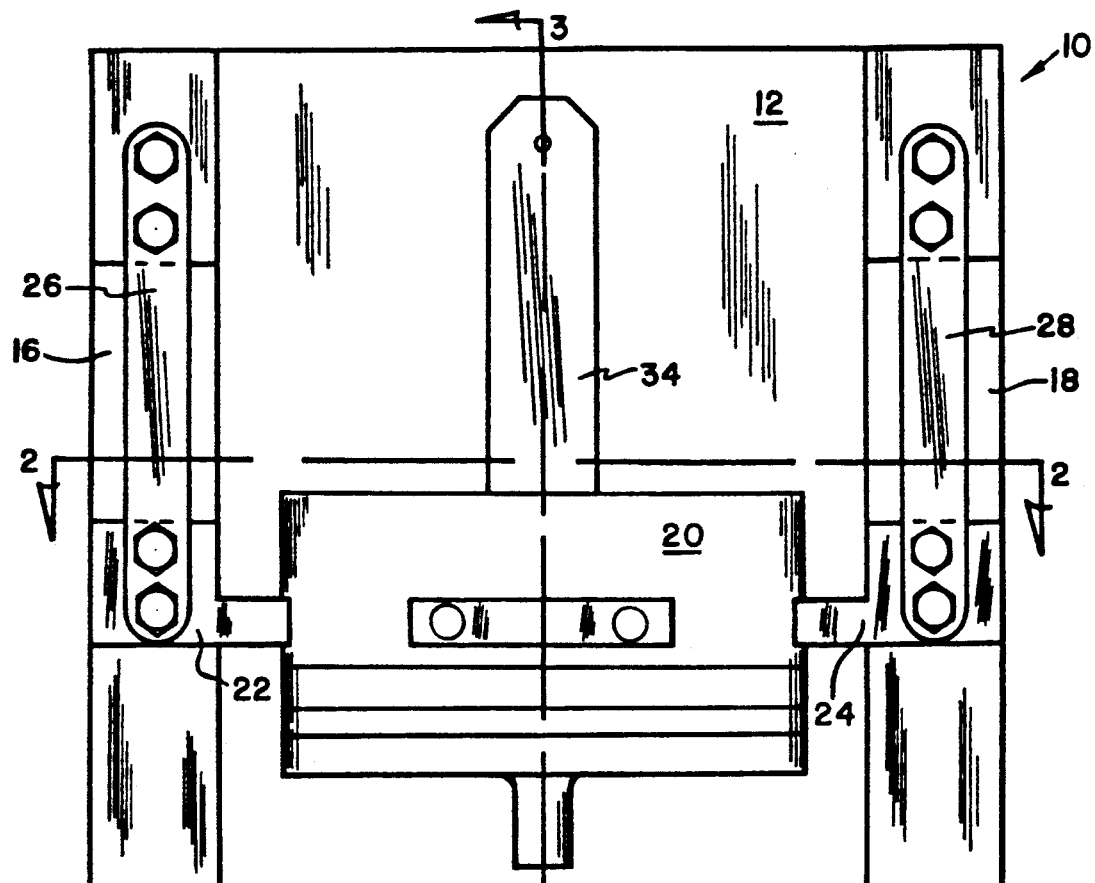
FIG. 1 is a view in elevation of the balancing apparatus made according to the teachings of the present invention.

Referring now to the drawings, balancing apparatus generally indicated by the numeral 10 includes a fixed support 12 comprising a transverse member 14 and a pair of sidearm members 16, 18 extending from opposite ends of the transverse member 14. A balancing fixture generally indicated by the numeral 20 includes laterally projecting arms 22, 24 which are secured to corresponding sidearm members 16, 18 by metal flexures 26, 28. Flexures 26, 28 are sufficiently flexible to permit tilting of the balancing fixture 20 relative to the fixed support 12 in a substantially vertical plane in response to vibration induced thereon by a rotating component 30 mounted thereon as will hereinafter be described.

Balancing fixture 20 includes a mount 32 projecting toward the transverse member 14 to which a pickup attachment bracket 34 is secured. Bracket 20 further includes a contoured balancing surface 36 which is contoured to be compatible with the contour of the member 30 which is to be balanced on the fixture 20. A portion 38 of the balancing surface 36 defines a circumferentially extending wall of a substantially cylindrical recess 40.

Figure 3:
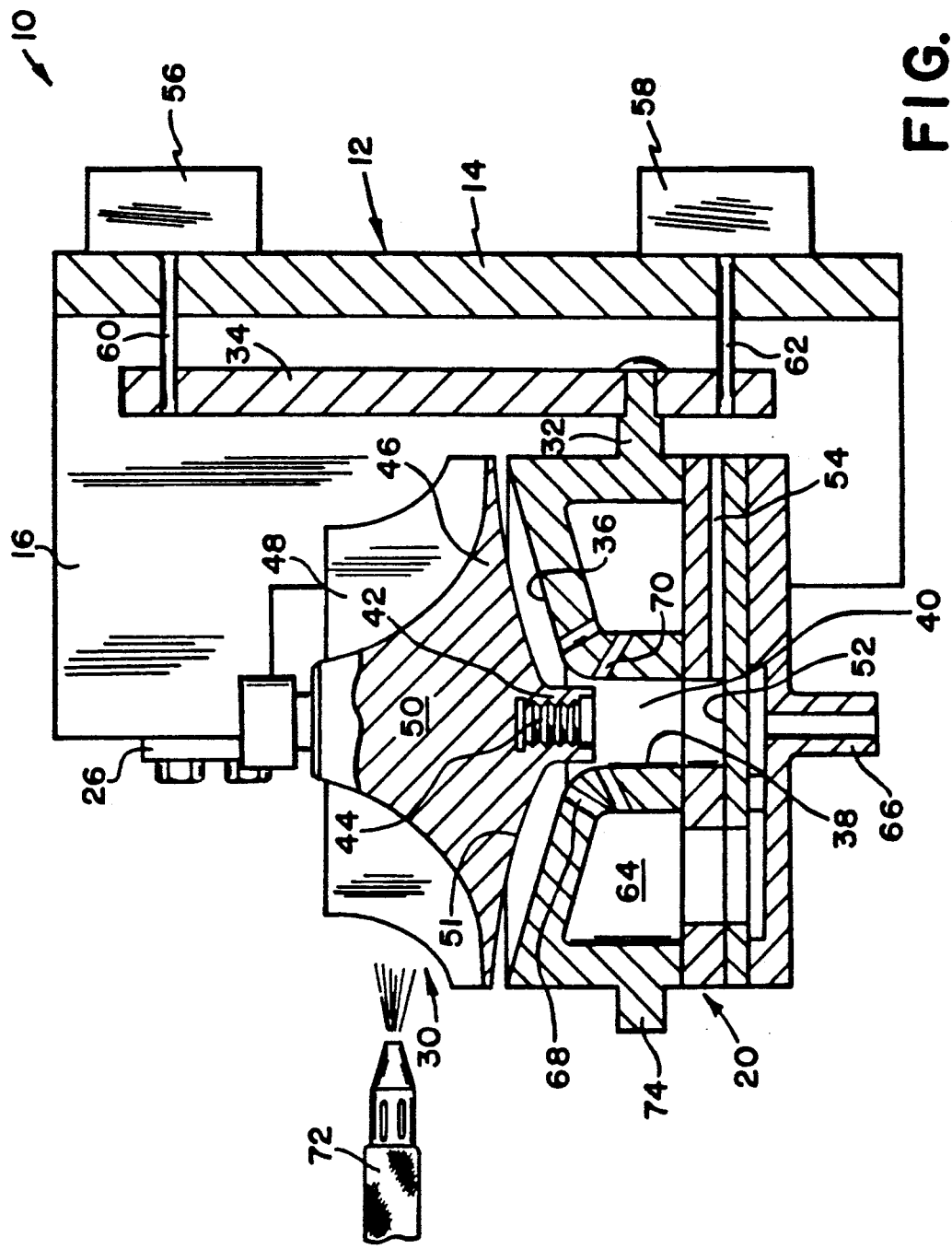
FIG. 3 is a view taken substantially along line 3—3 of FIG. 1.

The rotating component 30 as illustrated in FIG. 3 is a boreless compressor wheel which is to be mounted on the rotating shaft of an automotive turbocharger. Although the compressor wheel or rotating component 30 is described as "boreless", the component 30 does include an axially projecting hub 42 which does define a cylindrical bore 44. However, bore 44 is a blind bore and terminates short of the plane 46 of maximum radial extent of the rotating component 30. Since the centrifugal forces acting on the compressor wheel or rotating component 30 are at their maximum at the plane 46, and since the blind bore 44 terminates short of the plane 46, the compressor wheel will not be weakened by a bore that extends all of the way through the compressor wheel 30, common in prior art turbochargers. Compressor blades 48 project from the central portion 50 of the rotating component or compressor wheel 30. The lower surface 51 of the compressor wheel rotating component 30 is compatible with the balancing surface 36. When the compressor wheel 30 is installed on the fixture 20 for balancing, the surface 51 and hub 42 are received within the nest defined by the balancing surface 36 and recess 40. The axis of rotation of the compressor wheel 30 is, when the wheel is installed on the balancing fixture 20, substantially coaxial with the cylindrical recess 40. The portion of recess 40 defined between the closed end 52 thereof and the end of the hub 42 is vented to atmosphere through vent passage 54.

The centerline of the bracket 34 lies in substantially the same transverse plane as the axis of rotation of the compressor wheel 30 and extends substantially parallel thereto. A pair of conventional motion transducers 56, 58 are mounted on the transverse member 14 generally above and below the rotating component 30. Motion transducers 56, 58 are conventional, and generate electrical signals which vary as a function of the displacement of motion transmitting members 60, 62 which interconnect the bracket 34 and the transducers 56, 58. The motion transmitting members 60, 62 are attached to the bracket 34 substantially along the axis thereof which, as discussed above, is in the same vertical plane and parallel to the axis of rotation of the component 30.

Bracket 20 defines a circumferentially extending air manifold 64 therewithin. An air inlet 66 is communicated to a source of compressed air, which is communicated into the air manifold 64. A first set of circumferentially spaced air jets 68 extend through the balancing surface 36 and communicate the air manifold 64 with the surface 51 on the rotating component 30. Accordingly, air under pressure is injected between the balancing surface 36 and the surface 51 and lifts the rotating component 30 a very small distance above the balancing surface 36. Accordingly, the rotating component 30 can be supported on the air cushion injected through the jets 68. A second set of circumferentially spaced jets 70 communicate the air manifold 64 with the cylindrical recess 40, where a cushion of air acts against the hub 42 to position the rotating component laterally with respect to the cylindrical recess 40 so that the axis of rotation of the component 30 is maintained along the axis of the recess 40. An air jet 72 supplies compressed air which reacts against the blades 48 to rotate the rotating component 30 relative to the fixture 20. In order to assure that the balancing fixture 20 is initially substantially level, a counterweight 74 is added to the side of the balancing fixture 20 opposite the side to which the bracket 34 is attached.

Figure 2:
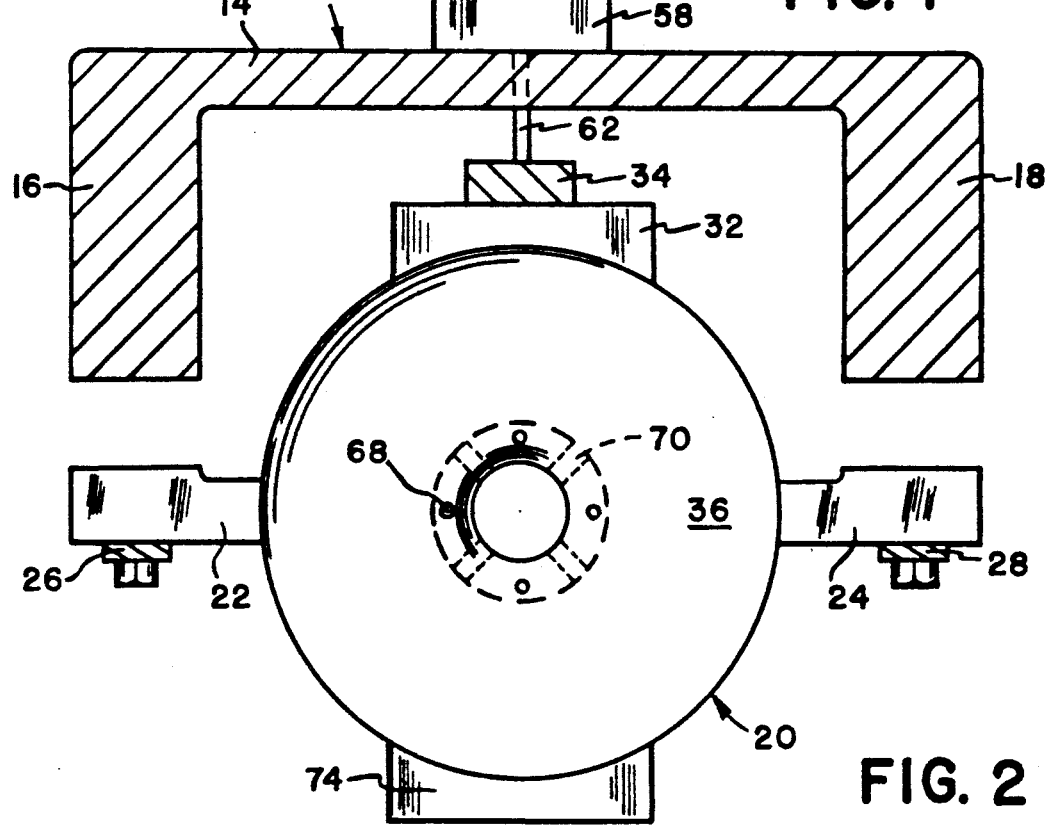
FIG. 2 is a cross-sectional view taken substantially along lines 2—2 of FIG. 1, but further illustrating a compressor wheel in place upon the balancing fixture for balancing.

In operation, the boreless compressor wheel or rotating component 30 which is to be balanced is placed on the next defined by the contoured balancing surface 36 substantially as illustrated in FIG. 2, with the hub portion 42 being received within the cylindrical recess 40. Compressed air is then communicated into the air manifold 64, where it acts through jets 68 against the surface 51 to support the rotating component or compressor wheel 30 a small distance above the balancing surface 36. Compressed air is communicated from manifold 64 through jets 70 to act against the hub 42 to properly position the compressor wheel 30 laterally with respect to the balancing fixture. Compressed air is then forced through a nozzle 72 and impinges upon the blades 48 to thereby rotate the compressor wheel 30 at speed up to substantially normal operating speeds.

The flexures 26, 28 are sufficiently flexible to permit tilting motion of the balancing fixture 20 during balancing of the rotating component or compressor wheel 30 in a substantially vertical plane. Accordingly, vibrations will be induced upon the balancing fixture 20 during rotation of the compressor wheel 30 which will cause vibration of the fixture 20, which will be seen as a tilting motion in the vertical plane as permitted by the flexures 26, 28. This vibratory tilting motion will be transmitted from the balancing fixture 34 to the motion transducers 56, 58 by the motion transmitting members 60, 62. Accordingly, transducers 56, 58 will generate electrical signals which vary as a function of the magnitude and direction of the vibration of the balancing fixture 20 induced by unbalance of the rotating component or compressor wheel 30.

The electrical signals generated by the transducers 56, 58 are transmitted to a conventional vibratory analysis device (not shown) which in a manner well known to those skilled in the art uses the signals generated by the transducers 56, 58 to determine the magnitude and location of unbalance of the rotating component or compressor wheel 30. Accordingly, the operator can make the appropriate correction to balance the rotating component or compressor wheel 30, such as by removing mass from the component 30 in order to achieve balance of the latter.

I claim:

1. Apparatus for dynamically balancing components rotatable about an axis of rotation comprising a fixed support, a balancing fixture, flexure means for mounting said balancing fixture on the fixed support for movement relative thereto, said balancing fixture defining an arborless balancing surface contoured for compatibility with a corresponding surface defined on said component, said component including a hub projecting along said axis, said balancing surface including a portion defining the wall of a recess receiving said hub, means for injecting fluid under pressure between the balancing surface and the corresponding surface on said component to support the component on a fluid film between said surfaces for rotation relative thereto, said injecting means including a fluid manifold defined within said balancing fixture, a first set of spaced-apart pressure jets extending through the balancing surface for communicating said manifold with the interface between said balancing surface and the corresponding surface on the component, and a second set of spaced-apart pressure jets for injecting fluid under pressure in the interface between said hub and the portion of the balancing surface defining said recess, means for rotation said component about said axis relative to said surface, and means for measuring displacement of the surface to determine unbalance of said component.

2. Apparatus for dynamically balancing components as claimed in claim 1, wherein the recess and the hub terminate in facing ends defining a chamber therebetween, and passage means venting said chamber.

3. Apparatus for dynamically balancing components as claimed in claim 1, wherein said means for measuring vibration of said surface includes a bracket projecting from said balancing fixture substantially parallel to said axis of rotation, a pair of motion transducers mounted on said fixed support, and means interconnecting said bracket with a corresponding one of said transducers.

4. Apparatus for dynamically balancing components as claimed in claim 3, wherein said motion transducers and said interconnecting means are located in axially spaced transverse planes relative to said axis of rotation.

* * * * *